(12) United States Patent
Zhang et al.

(10) Patent No.: US 7,242,575 B2
(45) Date of Patent: Jul. 10, 2007

(54) DISPLAY DEVICE HAVING A LATERAL SIDE INPUT-AND-OUTPUT MODULE

(75) Inventors: Jing-Lin Zhang, Chun-Nan (TW); Kuo-Wen Chen, Chu-Nan (TW)

(73) Assignee: Coretronic Corporation, Miao Li County (TW)

( * ) Notice: Subject to any disclaimer, the term of this patent is extended or adjusted under 35 U.S.C. 154(b) by 184 days.

(21) Appl. No.: 11/168,484

(22) Filed: Jun. 29, 2005

(65) Prior Publication Data

US 2006/0077627 A1  Apr. 13, 2006

(30) Foreign Application Priority Data

Oct. 8, 2004  (TW)  ............................. 93216024 U

(51) Int. Cl.
*H01R 13/44* (2006.01)
*H05K 5/00* (2006.01)

(52) U.S. Cl. .................. 361/681; 361/679; 361/683; 345/60; 345/50; 345/104; 349/58; 349/61; 439/76.1; 439/527; 439/372; 439/374

(58) Field of Classification Search ................ 361/679, 361/681, 683, 720, 748, 760, 761; 345/50, 345/60, 61, 104, 102, 87, 905, 1.3, 5; 313/49–51, 313/583; 349/58–60, 61; 439/372, 374, 439/131, 501, 76.1, 94.6, 630, 57, 140, 535, 439/378, 247, 248, 328, 607–610, 541.5, 439/490, 540.1, 536
See application file for complete search history.

(56) References Cited

U.S. PATENT DOCUMENTS

| | | | | |
|---|---|---|---|---|
| 6,020,867 | A * | 2/2000 | Shimada et al. | 345/87 |
| 6,312,270 | B1 * | 11/2001 | Hamon | 439/131 |
| 6,707,478 | B2 * | 3/2004 | Kim | 345/156 |
| 6,710,828 | B2 * | 3/2004 | Ma et al. | 349/58 |
| 6,837,742 | B1 * | 1/2005 | Chou et al. | 439/541.5 |
| 6,939,162 | B2 * | 9/2005 | Park | 439/378 |
| 7,091,665 | B2 * | 8/2006 | Nomoto et al. | 313/583 |
| 2005/0185365 | A1 * | 8/2005 | Yamaguchi et al. | 361/679 |

\* cited by examiner

*Primary Examiner*—Michael Datskovskiy
(74) *Attorney, Agent, or Firm*—Troxell Law Office, PLLC

(57) ABSTRACT

A display device includes a side I/O module sandwiched between a front frame and a rear cover to form a casing having a lateral side. The I/O module includes an L-shaped connector including a back plate fastened securely to the rear cover, and a side plate extending perpendicularly from the back plate and fastened the front frame so to prevent removal of the rear cover from the front frame in such a manner that the side plate is flush with the lateral side of the casing. A terminal substrate is mounted on the back plate opposite to the rear cover, and has a plurality of parallelly arranged terminal-receiving ports extending into the opening in the side plate so as to expose the ports exteriorly of the outer casing to facilitate insertion of terminals therein.

8 Claims, 5 Drawing Sheets

DISPLAY DEVICE HAVING A LATERAL SIDE INPUT-AND-OUTPUT MODULE

FIELD OF THE INVENTION

The invention relates to a display device, more particularly to a display device having a lateral side input-and-output module.

BACKGROUND OF THE INVENTION

Ever since the invention of the CRT-type TV sets (or particularly flat panel displays of today), the prices thereof are rapidly going down as the manufacture technology advances and is matured. Therefore, little profit can be gained from selling the display device. The manufacturers are making some alteration on its external appearance in order to attract the attention of the consumers so as to increase the sale.

A conventional display device, such as a TV set, is generally provided with a plurality sets of terminal ports at its rear cover for establishing electrical communication with its peripheral devices, such as a tape recording-and-reproducing instrument or a DVD player or a sound amplifier. The more the peripheral devices are connected to the display device, the better the entertainment effect the user can enjoy. However, one problem arises when the terminal ports are mounted on the rear cover of the display. Attachment or detachment of the terminal ports to the peripheral devices is somewhat inconvenient.

In one conventional display device, the terminal ports are provided at a lower portion of the front frame so that attachment and detachment of the peripheral device can be conducted with ease. However, exposure of the terminal ports advertently affects the aesthetic appearance of the display.

Referring to FIGS. 1 to 3, a conventional display device (such as a plasma TV set) includes a front frame 6, a rear cover 8 and a lateral side input-and-output module 4 sandwiched between the front frame 6 and the rear cover 8 to form a casing 2 that has a lateral side extending between the front frame 6 and the rear cover 8. The lateral side I/O module 4 generally includes a side connector 12 fixed to the front frame 6 and formed with a plurality of port-retentive sleeves 1202 defining openings, and a terminal substrate 14 having a plurality of parallelly arranged terminal-receiving ports 10. A plurality of fastener screws 18b extend through the holes 18a on the terminal substrate 14, and are fastened threadedly to the screw holes 18c in the inner surface of the rear cover 8 in such a manner that the ports 10 extend into the sleeves 1202 so as to expose the ports 10 to the exterior of the casing 2. The lateral side I/O module 4 further includes an electrical connector 16 connected to the ports 10 via a signal cable 20.

During assembly of the aforesaid conventional display device, the terminal substrate 14 is first of all mounted on the inner side surface of the rear cover 8. In order to establish electrical communication between the inner terminals in the casing 2 and the connector 16 of the terminal substrate 14, the inner terminals (not shown) are required to be projected outwardly from the front frame 6 so as to couple with the connector 16 once the rear cover 8 is brought toward the front frame 6. Thus the assembler needs to hold the front frame 6 and the rear cover 8 temporarily in order to form gap therebetween to permit coupling of the terminals with the connector 16 prior to coupling the front frame 6 and the rear cover 8, thereby inconveniencing the assembler.

The object of the present invention is to provide a lateral side input-and-output module used in a display device so as to eliminate the problems encountered during assembly of the conventional display device and reduce the electromagnetic interference around the display device.

SUMMARY OF THE INVENTION

One object of the present invention is to provide a display device having a lateral side input-and-output module with simple structure that can eliminate the aforesaid disadvantages encountered during assembly of the conventional display device.

A display device of the present invention includes: a front frame; a rear cover; and a lateral side I/O module sandwiched between the front frame and the rear cover to define an outer casing having a lateral side extending between the front frame and the rear cover. The lateral side I/O module includes: an L-shaped connector including a back plate fastened securely to the rear cover; and a side plate extending perpendicularly from the back plate and fastened to the front frame to prevent removal of the rear cover from the front frame in such a manner that the side plate is flush with the lateral side of the casing, the side plate having a plurality of opening for access into the casing, and a terminal substrate mounted on the back plate opposite to the rear cover and having a plurality of parallelly arranged terminal-receiving ports extending into the opening in the side plate so as to expose the ports exteriorly of the outer casing to facilitate insertion of terminals therein.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCCRIPTIONS OF THE PREFERRED EMBODIMENT

Figure 1:
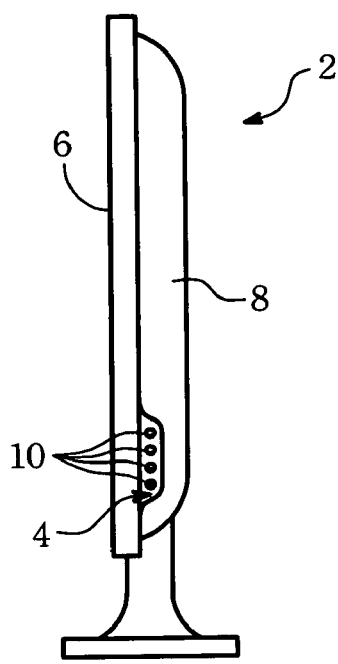
FIG. 1 is a side view of a conventional display device.
Figure 2:
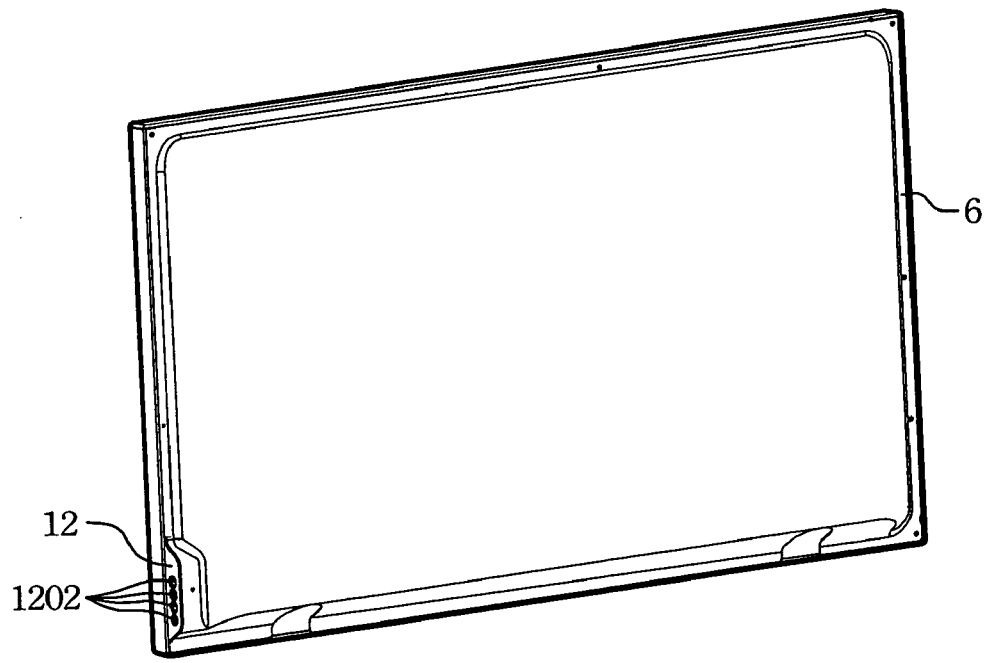
FIG. 2 is a rear view of a front frame employed in the conventional display device.
Figure 3:
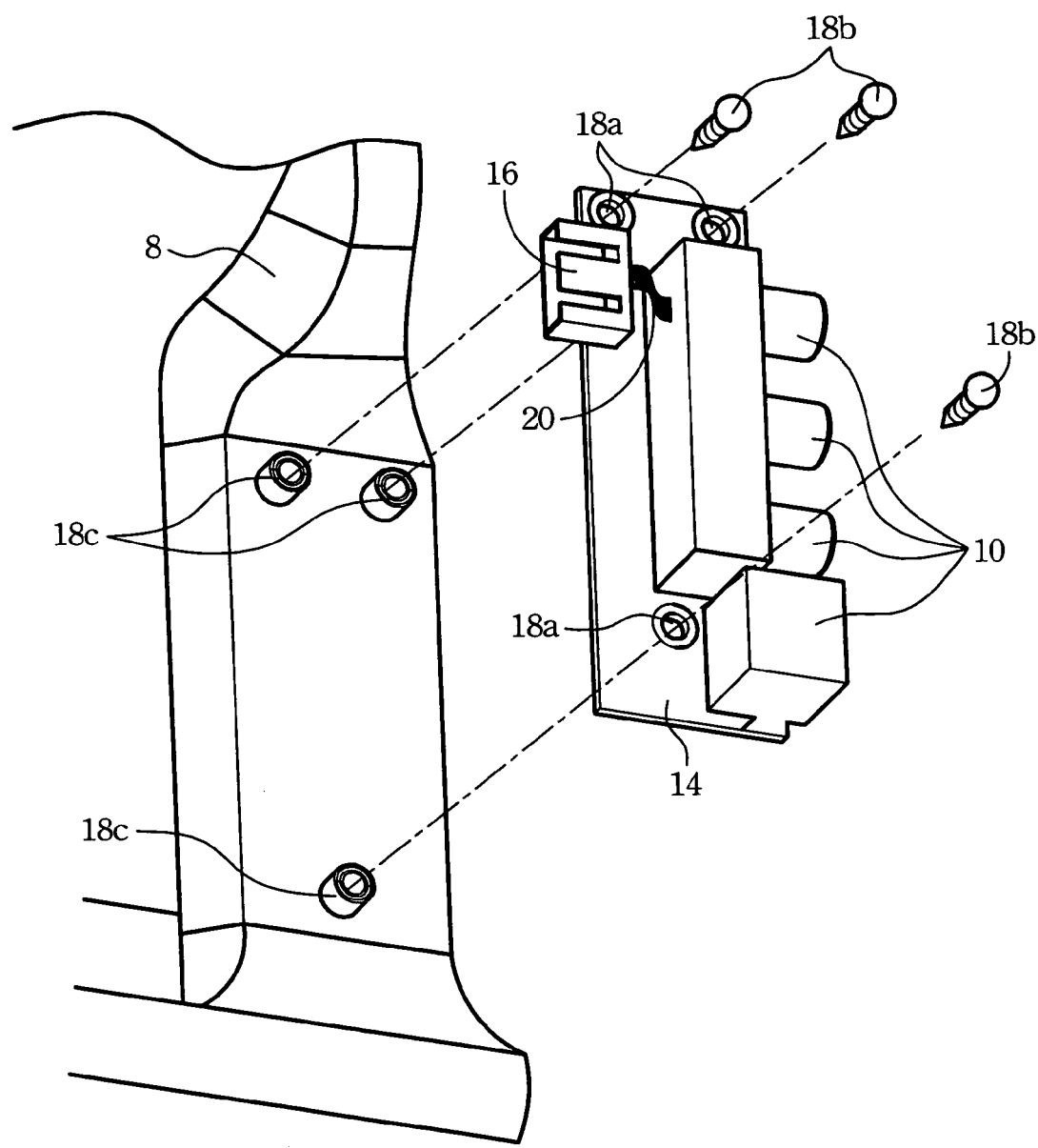
FIG. 3 is a fragmentary front view of a rear cover employed in the conventional display device.
Figure 4:
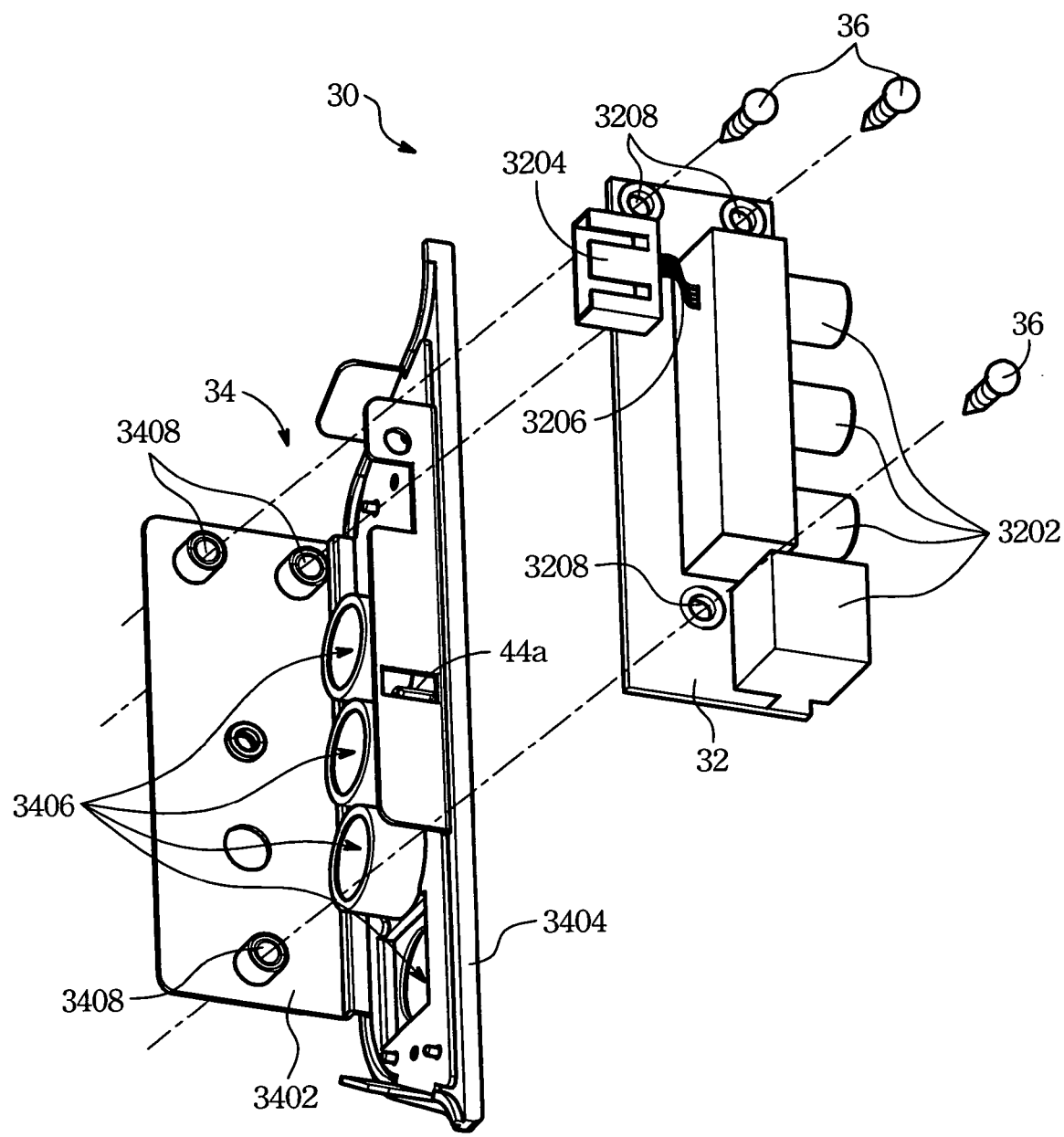
FIG. 4 is an exploded view of a lateral input-and-output module employed in the preferred embodiment of a display device of the present invention.
Figure 5:
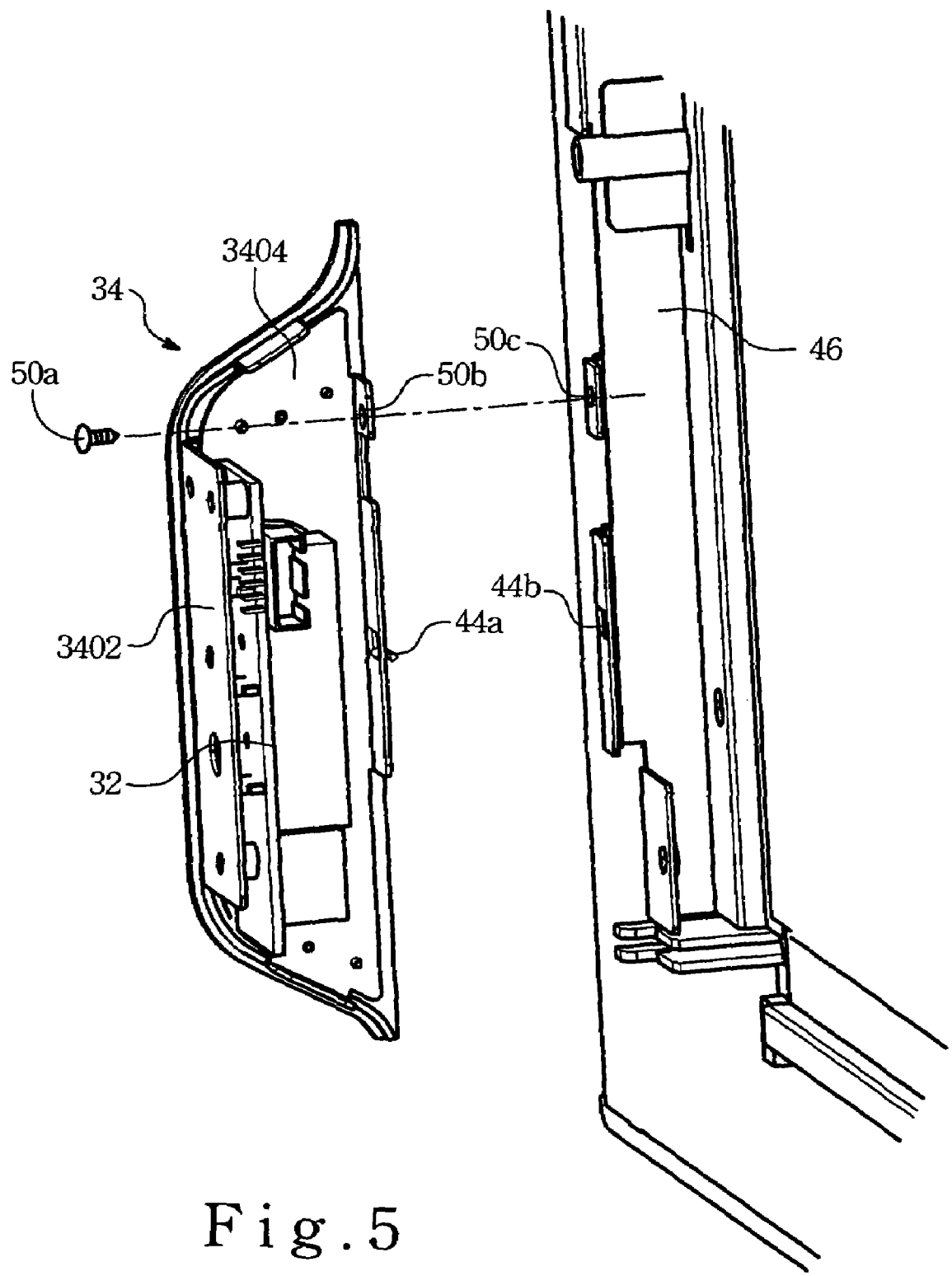
FIG. 5 illustrates how the lateral input-and-output module shown in FIG. 4 is mounted on the front frame of the display device of the present invention.
Figure 6:
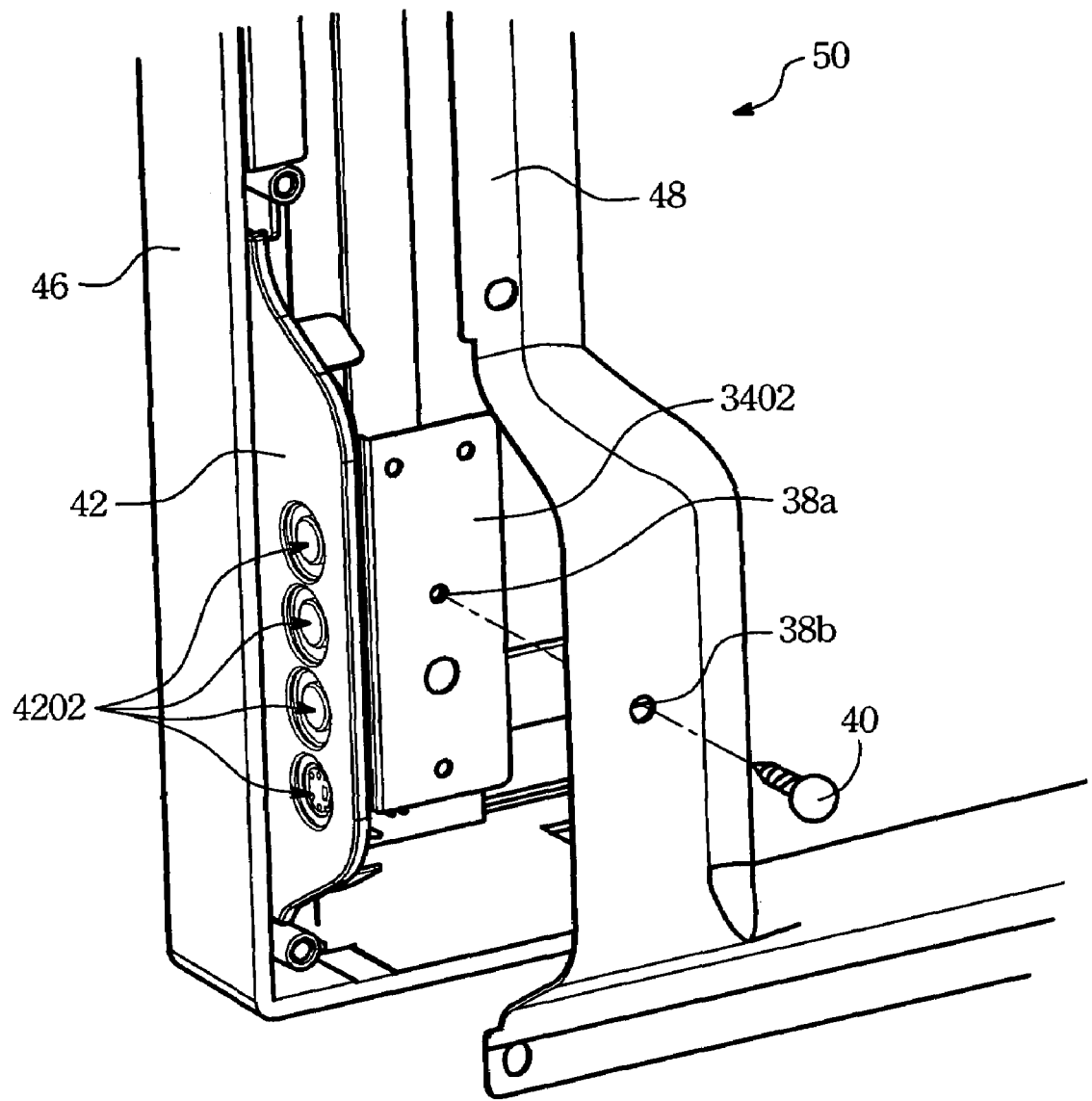
FIG. 6 is a fragmentary and partly exploded view of the display device of the present invention.

Referring to FIGS. 4 and 6, the preferred embodiment of a display device (such as a plasma TV set) according to the present invention includes a front frame 46, a rear cover 48 and a lateral side input-and-output module 30 sandwiched between the front frame 46 and the rear cover 48 to form an outer casing 50 having a lateral side extending between the front frame 46 and the rear cover 48.

The front frame 46 and the rear cover 48 are generally made of metal in order to provide sufficient rigidity of the casing 50. Alternatively, the front frame 46 and the rear cover 48 can be made of conductive material. A display (not shown) can be disposed in the front frame 46 in a conventional manner. The front frame 46 is formed with a plurality of hook-retentive holes 44b at the right side thereof. The rear cover 48 is formed with a plurality of through holes 38b.

The lateral side I/O module 30 includes an L-shaped connector 34 and a terminal substrate 32. The L-shaped connector 34 is preferably made of metal, and includes a back plate 3402 and a side plate 3404 extending perpendicularly from the back plate 3402. The terminal substrate 32 includes a printed circuit board made from epoxy resin, and has a plurality of parallelly arranged terminal-receiving ports 3202. The terminal substrate 32 further includes a terminal connector 3204 and a flat flexible cable 3206 via which the ports 3202 are electrically connected to the terminal connector 3204. The side plate 3404 is formed with a plurality of openings 3406, and further has a plurality of port-protecting sleeves projecting inwardly from the peripheries confining the openings 3406. The terminal substrate 32 is firstly disposed on the back plate 3402 of the L-shaped connector 34 in such a manner that the ports 3202 of the terminal substrate 32 extends respectively into the port-protecting sleeves of the side plate 3404. Preferably, a plurality of screws 36 extend through the through holes 3208 on the terminal substrate 32, and are threaded in the screw holes 3408 in the inner side surface of the back plate 3402. The side plate 3404 of the L-shaped connector 34 further has a plurality of resilient hooks 44a extending and engaging the peripheries defining the hook-retentive holes 44b in the front frame 46, thereby mounting the L-shaped connector 34 on the front frame 46 such that the side plate 3404 is flush with the lateral side of the casing 50. Preferably, a plurality of screws 50a extend through the holes 50b on the side plate 3404, and are threaded into the screw holes 50c in the front frame 46, thereby strengthening the engagement between the L-shaped connector 34 and the front frame 46.

The rear cover 48 is disposed rearwardly of the lateral side I/O module 30. A plurality fastener screws 40 are inserted through the through hole 38b in the rear cover 48 to engage threadedly the threaded holes 38a in the back plate 3402, thereby preventing removal of the rear cover 48 from the lateral side I/O module 30 and completing the assembly of the outer casing of the display device of the present invention. Of course, some reinforcing screws (not shown) are used to enhance the engagement between the front frame 46 and the rear cover 48.

After assembly, the ports 3202 of the terminal substrate 32 are respectively exposed to the exterior of the casing 50. In other words, the terminals of a connecting cable (not shown) can be inserted into the ports 3202 of the terminal substrate 32 for establishing electrical communication between a peripheral device (such as a DVC player) and the display device of the present invention.

In this preferred embodiment, a panel 42 is disposed on an outer side surface of the side plate 3404 of the L-shaped connector 34 in order to provide aesthetic effect of the lateral side I/O module 30. The panel 42 has a plurality of exposing holes 4202 overlapping the openings 3406 in the side plate 3404 of the L-shaped connector 34.

Note that in the above preferred embodiment, after assembly of the lateral side I/O module 30 on the front frame 46, the rear cover 48 is mounted directly on the back plate 3402 of the L-shaped connector 34. Unlike the conventional display device, since connection of the connector 3204 with the inner electronic components are already coupled together, the rear cover 48 is not required to be held temporarily apart from the front frame 46, thereby eliminating the prior art disadvantage encountered during assembly of the conventional display device. In addition, by virtue of mounting the terminal substrate 32 on the back plate 3402 of the L-shaped 34, the contact area between the terminal substrate 32 and the rear surface of the front frame 46 is increased, thereby reducing the electromagnetic interference caused around the terminal-receiving ports 3202 of the terminal substrate 32.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A display device comprising:
   a front frame;
   a rear cover; and
   a lateral side I/O module sandwiched between said front frame and said rear cover to define an outer casing having a lateral side extending between said front frame and said rear cover, said side I/O module including:
   a L-shaped connector including a back plate fastened securely to said rear cover and a side plate extending perpendicularly from said back plate and fastened to said front frame to prevent removal of said rear cover from said front frame, said slide plate being flush with said lateral side of said casing, said side plate having a plurality of openings for access into said casing, and
   a terminal substrate mounted on said back plate opposite to said rear cover and having a plurality of parallelly arranged terminal-receiving ports extending into said opening in said side plate to expose said ports exteriorly of said outer casing to facilitate insertion of terminals therein.

2. The display device according to claim 1, wherein said L-shaped connector is made of metal.

3. The display device according to claim 1, further comprising a terminal connector and a cable, said terminal connector being electrically connected to said ports of said terminal substrate via said cable.

4. The display device according to claim 1, wherein said terminal substrate is screwed onto said back plate of said L-shaped connector.

5. The display device according to claim 1, further comprising a plurality of fastener screws, said back plate having a plurality of threaded holes, said rear cover having a plurality of through holes, said fastener screws extending through said through hole in said rear cover and engaged threadedly to said threaded holes in said back plate and thereby engaging said rear cover to said back plate of said L-shaped connector.

6. The display device according to claim 1, wherein said front frame has a hook-retentive hole, said side plate of said L-shaped connector having a resilient hook engaging the periphery defining said hook-retentive hole in said front frame.

7. The display device according to claim 1, wherein said side plate of said L-shaped connector further has a plurality of port-protecting sleeves projecting inwardly from the peripheries confining said opening in said side plate, said ports of said terminal substrate extending respectively into said port-protecting sleeves of said side plate.

8. The display device according to claim 1, further comprising a panel disposed on an outer side surface of said side plate of said L-shaped connector, a plurality of exposing holes overlapping said openings in said side plate of said L-shaped connector.

\* \* \* \* \*